United States Patent
Bakshi

(10) Patent No.: US 12,284,636 B2
(45) Date of Patent: Apr. 22, 2025

(54) SYSTEMS AND METHODS FOR RADIO CHANNEL PARAMETER OPTIMIZATION IN A WIRELESS NETWORK

(71) Applicant: Verizon Patent and Licensing Inc., Basking Ridge, NJ (US)

(72) Inventor: Rakesh Bakshi, Bridgewater Township, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 18/739,488

(22) Filed: Jun. 11, 2024

(65) Prior Publication Data

US 2024/0334406 A1    Oct. 3, 2024

Related U.S. Application Data

(63) Continuation of application No. 17/671,721, filed on Feb. 15, 2022, now Pat. No. 12,035,289.

(51) Int. Cl.
| | | |
|---|---|---|
| H04W 16/10 | (2009.01) | |
| H04W 24/00 | (2009.01) | |
| H04W 28/04 | (2009.01) | |
| H04W 72/04 | (2023.01) | |
| H04W 72/0446 | (2023.01) | |

(52) U.S. Cl.
CPC .............. *H04W 72/0446* (2013.01)

(58) Field of Classification Search
CPC .......... H04W 72/0446; H04W 72/52
USPC .................................... 455/452.1
See application file for complete search history.

(56) References Cited

U.S. PATENT DOCUMENTS

| | | | | |
|---|---|---|---|---|
| 2005/0201332 A1* | 9/2005 | Bakshi | ............... | H04W 52/40 370/332 |
| 2009/0046655 A1* | 2/2009 | Zhao | ............... | H04W 24/04 370/328 |
| 2011/0105155 A1* | 5/2011 | Bienas | ............... | H04W 68/02 455/458 |
| 2016/0329941 A1* | 11/2016 | Bengtsson | ........ | H04W 72/0446 |
| 2019/0312635 A1* | 10/2019 | Ang | ............... | H04B 7/2668 |
| 2021/0235473 A1* | 7/2021 | Parekh | ............... | H04W 72/542 |

OTHER PUBLICATIONS

IP.com Search History (Year: 2024).*
ProQuest Search History (Year: 2024).*

* cited by examiner

*Primary Examiner* — Moustapha Diaby

(57) ABSTRACT

A system described herein may identify a first set of channel parameters associated with a User Equipment ("UE"). The first set of channel parameters may include timing parameters indicating time intervals at which traffic is able to be wirelessly communicated between the UE and a radio access network ("RAN"), and resource allocation parameters indicating a measure of wireless resources allocated to communicating traffic between the UE and the RAN. The system may generate a second set of channel parameters based on a quantity of instances that traffic was communicated between the UE and the RAN at a beginning of one or more time intervals, indicated by the first set of channel parameters, and a measure of utilization of the allocated wireless resources during the particular timeframe. The UE and the RAN may subsequently communicate using the second set of channel parameters.

20 Claims, 13 Drawing Sheets

SYSTEMS AND METHODS FOR RADIO CHANNEL PARAMETER OPTIMIZATION IN A WIRELESS NETWORK

CROSS-REFERENCE TO RELATED APPLICATION

This Application is a Continuation of U.S. patent application Ser. No. 17/671,721, filed on Feb. 15, 2022, titled "SYSTEMS AND METHODS FOR RADIO CHANNEL PARAMETER OPTIMIZATION IN A WIRELESS NETWORK," the contents of which are herein incorporated by reference in their entirety.

BACKGROUND

Wireless user equipment ("UE"), such as mobile telephones or other wireless communication devices, may communicate with a base station of a radio access network ("RAN") of a wireless network. The communications may include periodically "waking" or entering an "active" mode in order to wirelessly send or receive data to or from the base station, and periodically entering a "sleep" or "idle" mode in order to conserve battery power. The base station may allocate a set of radio resources, such as Physical Resource Blocks ("PRBs"), for the UE. Communications to or from the UE may utilize some or all of the allocated radio resources.

DETAILED DESCRIPTION OF EXAMPLE EMBODIMENTS

Figure 1:
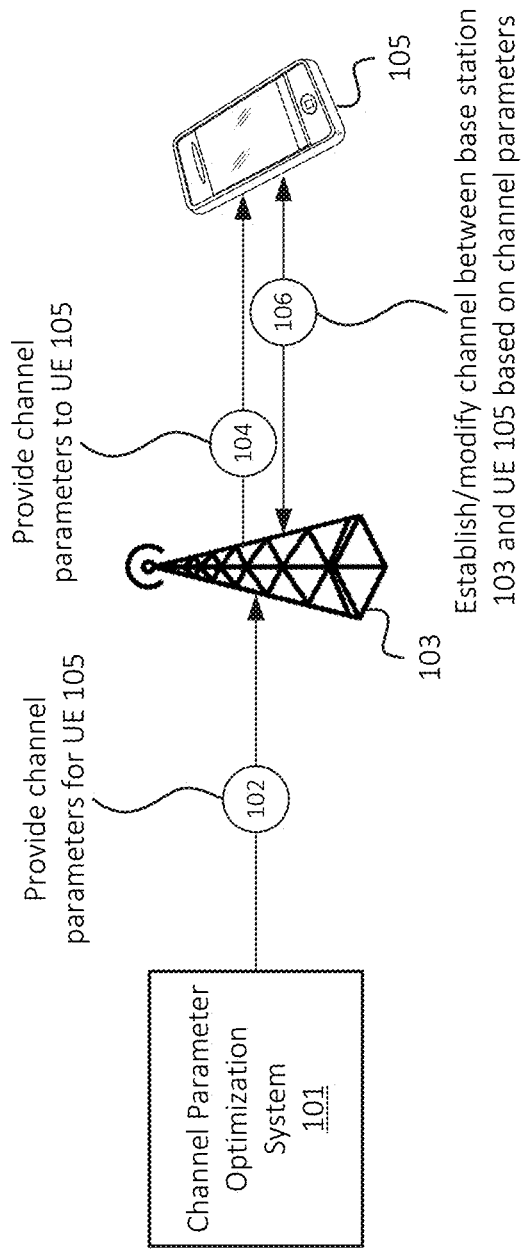
FIGS. 1 and 2 illustrate an example overview of one or more embodiments described herein.

The following detailed description refers to the accompanying drawings. The same reference numbers in different drawings may identify the same or similar elements.

Embodiments described herein provide for the generating or modifying of radio channel parameters associated with communications between one or more UEs and one or more base stations of a wireless network. Such generating or modifying of radio channel parameters may provide for the optimization of network efficiency, performance, and/or UE power consumption. The radio channel parameters may include channel monitoring and/or timing parameters (e.g., Discontinuous Reception ("DRX") parameters or other suitable parameters), resource allocation parameters (e.g., Bandwidth Part ("BP") parameters or other suitable parameters), and/or other parameters or attributes of one or more radio channels between the one or more UEs and the one or more base stations.

As discussed below, such parameters may be determined based on a measure of delay between the availability of uplink and/or downlink traffic associated with a UE and the transmission of such traffic to and/or from the UE. In some embodiments, such parameters may be determined based on a measure of utilization of allocated radio resources associated with the UE. For example, a particular quantity of PRBs or other allocation of bandwidth may be granted to the UE, and the utilization may be based on how much the allocated radio resources were actually used to wirelessly carry data to and/or from the UE.

Generally, the wireless channel parameters may be determined, in accordance with some embodiments, in a manner that optimizes Quality of Service ("QoS") metrics associated with the traffic to and/or from the UE, as well as the efficiency of the network. The efficiency of the network may be optimized, for example, based on increasing or maximizing utilization of radio resources as well as reducing or minimizing the switching of radio resource allocations (e.g., increasing or decreasing such allocations). For example, modifying the radio resource allocation for a UE may consume time, processing resources, and/or other resources, and minimizing or eliminating such modifications may further improve QoS metrics for the UE. The parameters may further be determined in a manner that reduces or minimizes traffic delay (e.g., as discussed above) and that reduces or minimizes UE power consumption associated with periodically communicating with the wireless network (e.g., to "wake up" or enter an "active" mode to send traffic and/or to monitor a radio channel for traffic). The determination of the wireless channel parameters based on the measure of delay and the radio resource utilization, as described herein, may provide for the optimization of network efficiency, QoS metrics, as well as UE power consumption. Further, as discussed below, a UE may be able to determine or calculate some or all of the metrics described herein based which the traffic parameters are determined, thus reducing or eliminating the need for network elements to perform such calculations, thereby saving processing resources of the network.

As shown in FIG. 1, Channel Parameter Optimization System ("CPOS") 101 may provide (at 102) channel parameters to base station 103. In some embodiments, CPOS 101 may communicate with multiple base stations in addition to base station 103. In some embodiments, CPOS 101 may communicate with base station 103 and/or one or more other base stations via an application programming interface ("API") or some other suitable interface or communication pathway. In some embodiments, CPOS 101 may be implemented by, and/or may be communicatively coupled to a Multi-Access/Mobile Edge Computing ("MEC") device, referred to sometimes herein simply as a "MEC," that is deployed locally at base station 103. In some embodiments, each base station 103 may be associated with its own independent instance of CPOS 101.

The channel parameters (provided at 102) may be associated with one or more UEs, such as UE 105. As discussed below, the channel parameters may be associated with a group of UEs, a particular set of geographical regions, a particular base station or set of base stations, and/or some other type of category or level of granularity. In some embodiments, the channel parameters may include channel monitoring and/or timing parameters (e.g., DRX parameters or other suitable parameters), resource allocation parameters (e.g., BP parameters or other suitable parameters), and/or other parameters associated with wireless communications between base station 103 and UE 105.

In some embodiments, the channel parameters may be a "default" set of parameters. In some embodiments, the channel parameters may be a set of parameters selected by CPOS 101 and/or some other device or system based on one or more other factors, such as an identifier of base station 103, a geographical location of base station 103 and/or UE 105, a device type of UE 105 (e.g., mobile phone, Internet of Things ("IoT") device, etc.), a category or group to which UE 105 belongs (e.g., a particular organization, a first responder category, etc.), and/or other factors.

In some embodiments, the channel parameters may be a set of channel parameters determined in a manner discussed below. For example, as discussed herein, CPOS 101 may modify or refine channel parameters in an ongoing basis (e.g., using modeling including artificial intelligence/machine learning ("AI/ML") techniques or other suitable techniques), and may thus provide modified channel parameters in an iterative manner, such that one or more measures of yield, performance, or other metrics are optimized. As noted above, such metrics may include traffic delay due to particular monitoring parameters, radio resource utilization, and/or other metrics.

As noted above, the channel parameters may include channel monitoring and/or timing parameters, radio resource allocation parameters, and/or other suitable parameters. The channel monitoring and/or timing parameters may include DRX parameters or other types of channel monitoring and/or timing parameters. For example, the channel monitoring and/or timing parameters may specify an interval at which one or more communication channels (e.g., a Physical Uplink Shared Channel ("PUSCH"), a Physical Downlink Shared Channel ("PDSCH"), a Physical Uplink Control Channel ("PUCCH"), a Physical Downlink Control Channel ("PDCCH"), etc.) are active between base station 103 and UE 105. For example, during the active intervals (also referred to as "ON" durations), base station 103 may provide downlink traffic, if available, to UE 105 via the PDSCH and/or the PDCCH. Further, during the active intervals, UE 105 may provide uplink traffic, if available, to base station 103 via the PUSCH and/or the PUCCH. During the inactive intervals (also referred to as "OFF" durations), base station 103 and UE 105 may refrain from sending traffic to each other via such channels. As such, UE 105 may power off one or more radios, may enter a low power mode for such radios, may enter an "idle" mode, and/or may otherwise not monitor such channels during the inactive intervals. Refraining from monitoring these channels during the inactive intervals may save UE power consumption in comparison to monitoring the channels at all times.

As further noted above, the channel parameters may include radio resource allocation parameters. Such radio resource allocation parameters may indicate an amount of bandwidth, such as in the time and/or frequency domains, to allocate for uplink and/or downlink traffic associated with UE 105. For example, the radio resource allocation parameters may specify a quantity of PRBs, may specify particular PRBs out of a set of available PRBs, may specify an amount of bandwidth (e.g., 100 MHz, 60 MHz, etc.), and/or may otherwise specify an amount or measure of radio resources to be allocated for uplink and/or downlink traffic associated with UE 105. Accordingly, UE 105 may send and/or receive, in a given timeframe, an amount of traffic that is up to the specified allocation. If the amount of traffic to be sent or received to or from UE 105 in a given timeframe exceeds the specified allocation for that timeframe, a portion of such traffic may be sent in a subsequent timeframe. On the other hand, if the amount of traffic to be sent or received to or from UE 105 in the given timeframe is lower than the specified allocation for that timeframe, a portion of the allocated radio resources may be "unused" or "unutilized."

Base station 103 may maintain the received (at 102) channel parameters. In some embodiments, base station 103 may modify one or more configuration parameters of base station 103 in accordance with the received channel parameters. For example, in situations where the received channel parameters indicate different parameters than base station 103 was using before receiving (at 102) the channel parameters, base station 103 may modify such parameters to match the newly received channel parameters. Base station 103 may also provide (at 104) the channel parameters to UE 105. For example, base station 103 may provide such parameters via Radio Resource Control ("RRC") signaling or other suitable control signaling. In some embodiments, base station 103 may provide (at 104) the parameters to UE 105 to modify one or more existing channels between UE 105, in order to modify an existing connection between UE 105 and base station 103. In some embodiments, base station 103 may provide the parameters to UE 105 during an initial radio connection setup procedure.

Base station 103 and UE 105 may accordingly establish (at 106) a new connection and/or modify an existing connection based on the received channel parameters. For example, UE 105 may enter an active and/or an idle mode at intervals specified by the channel parameters, may schedule the transmission of uplink data based on the intervals specified by the channel parameters, may schedule or queue the transmission of uplink data based on the amounts of resources allocated per timeframe, etc. Similarly, base station 103 may monitor the uplink channel or channels for traffic from UE 105 at intervals specified by the channel parameters, may schedule the transmission of downlink data based on the intervals specified by the channel parameters, may schedule or queue the transmission of downlink data based on the amounts of resources allocated per timeframe, etc.

Figure 2:
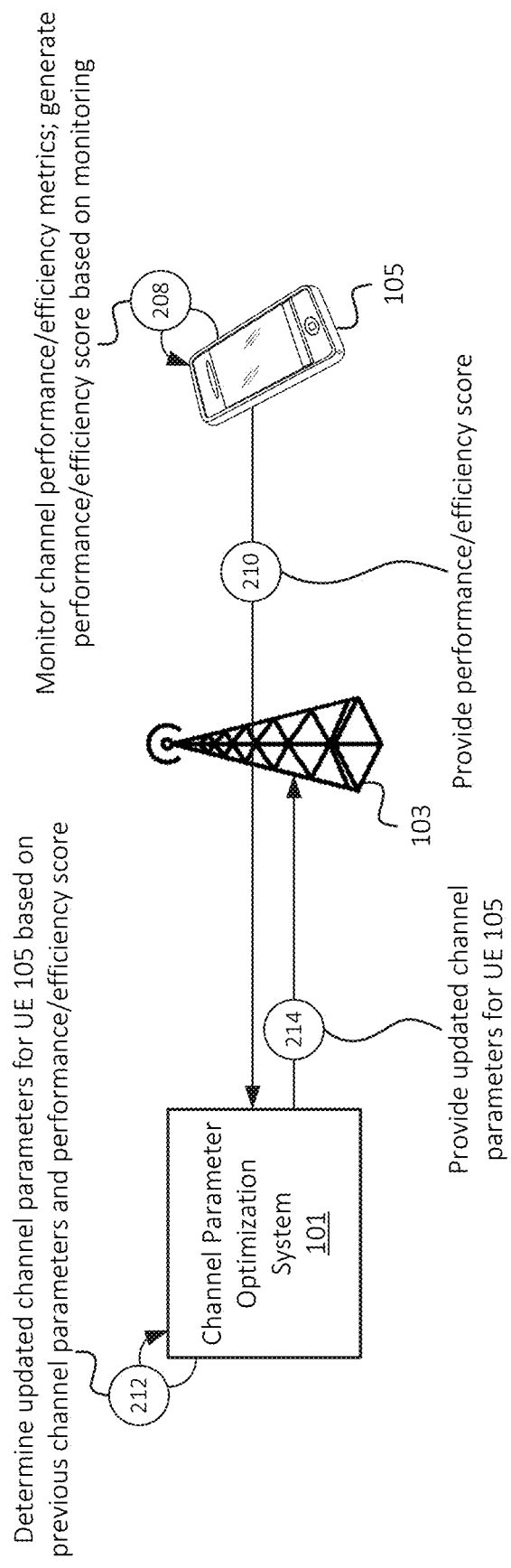

As further shown in FIG. 2, UE 105 may monitor (at 208) performance and/or efficiency metrics (referred to herein simply as "efficiency metrics" for the sake of brevity) associated with the channel(s) between base station 103 and UE 105, implemented in accordance with the received channel parameters. For example, UE 105 may monitor and/or determine a measure of delay based on the monitoring intervals associated with the channel parameters.

Figure 3:
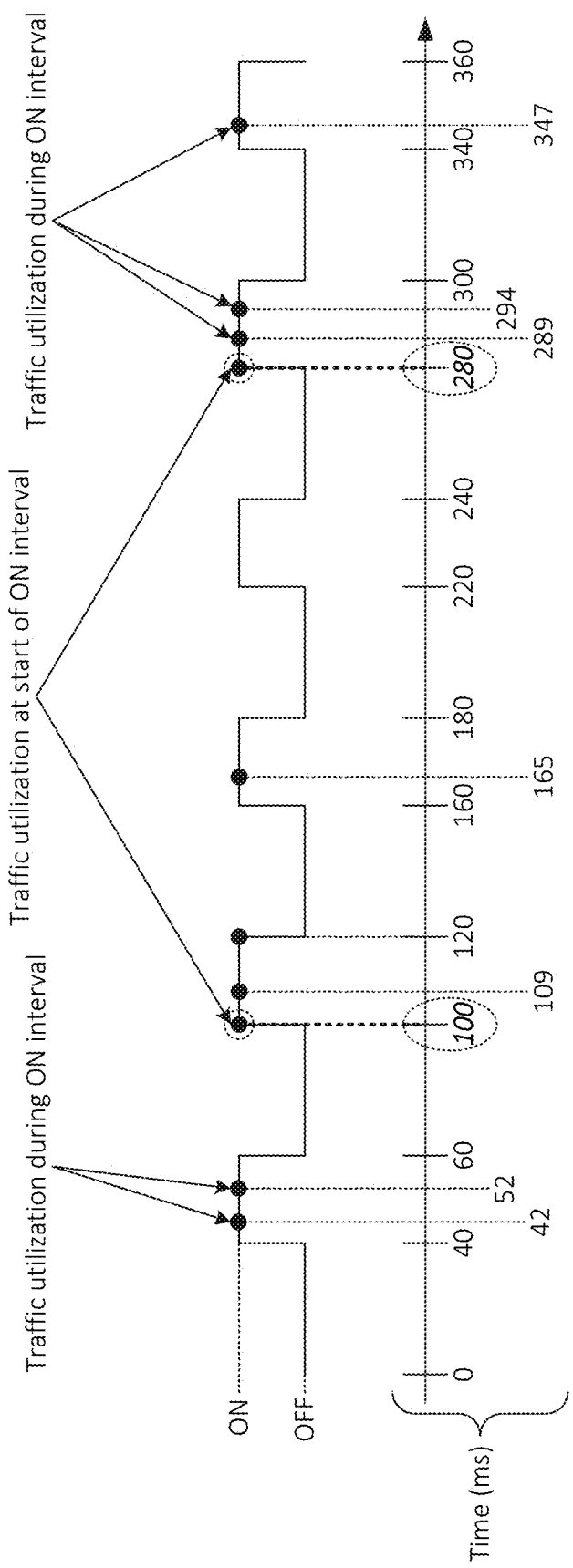
FIG. 3 illustrates an example of determining monitoring delay associated with a particular set of channel monitoring and/or timing parameters, in accordance with some embodiments.

FIG. 3 illustrates an example of how such measure of delay may be determined or computed. As shown, the monitoring intervals may specify that UE 105 should be idle (e.g., an "OFF" duration) for 40 milliseconds ("ms") and then active (e.g., an "ON" duration) for 20 ms, in a repeating pattern. In practice, the monitoring intervals may be specified in some other way, including a non-repetitive or non-cyclical sequence.

The example of FIG. 3 illustrates the sending and/or receiving of traffic to and/or from UE 105 at times that fall within the ON durations during a 360 ms time window. Specifically, FIG. 3 shows traffic utilization (e.g., the sending and/or receiving of traffic to and/or from UE 105) at the following times: 42 ms, 52 ms, 100 ms, 109 ms, 120 ms, 165 ms, 280 ms, 289 ms, 294 ms, and 347 ms. In accordance with some embodiments, UE 105 may determine instances in which traffic utilization occurred at the beginning of an ON duration (e.g., within a threshold of the beginning of the ON duration, such as within 1 ms, the first available PRB of the ON duration, etc.).

In this example, two such instances may be identified: the traffic utilization at 100 ms and the traffic utilization at 280 ms. The utilization at the beginning of the ON duration indicates the possibility of delay with respect to the traffic sent or received at such instances. For example, the traffic may have been available to send or receive at some time within the OFF duration, but may have been delayed (e.g., queued) while waiting for the beginning of the ON duration. As such, a measure of delay may be determined with respect to traffic that was utilized at the beginning of the ON duration, which may be a function of the preceding OFF duration. For example, each instance of traffic utilization at the beginning of the ON duration may be determined as being associated with a delay of half of the preceding OFF duration.

For example, the traffic utilized at 100 ms may have been ready (e.g., queued) at any point from 60 ms (e.g., after the end of the preceding ON duration) through 100 ms. Here, the delay associated with the traffic utilized at 100 ms may be determined as 20 ms, which is half of the 40 ms OFF duration. Such determination may be based on an assumption that, on average, the traffic was ready for sending in the middle of the OFF duration. In some embodiments, the delay may be computed in some other manner, and/or may be based on one or more other factors.

Similarly, the measure of delay associated with the traffic utilized at 280 ms may also be determined as 20 ms (e.g., half of the previous OFF duration). As such, during the 360 ms time window, the cumulative measure of delay determined may be 40 ms, which may be based on (e.g., the sum of) the measure of delay determined with respect to the traffic at 100 ms, and the measure of delay determined with respect to the traffic at 280 ms. The overall measure of delay for the 360 ms time window, computed according to some embodiments, may thus be 0.11 (40/360).

In some embodiments, the overall measure of delay may be computed using one or more other functions, and/or may be based on other factors. For example, in some embodiments, the overall measure of delay may be computed as a function of the instances of delay and the total OFF duration (e.g., 40/240 in this example), as a function of the instances of delay and the total ON duration (e.g., 40/120 in this example), etc.

Figure 4:
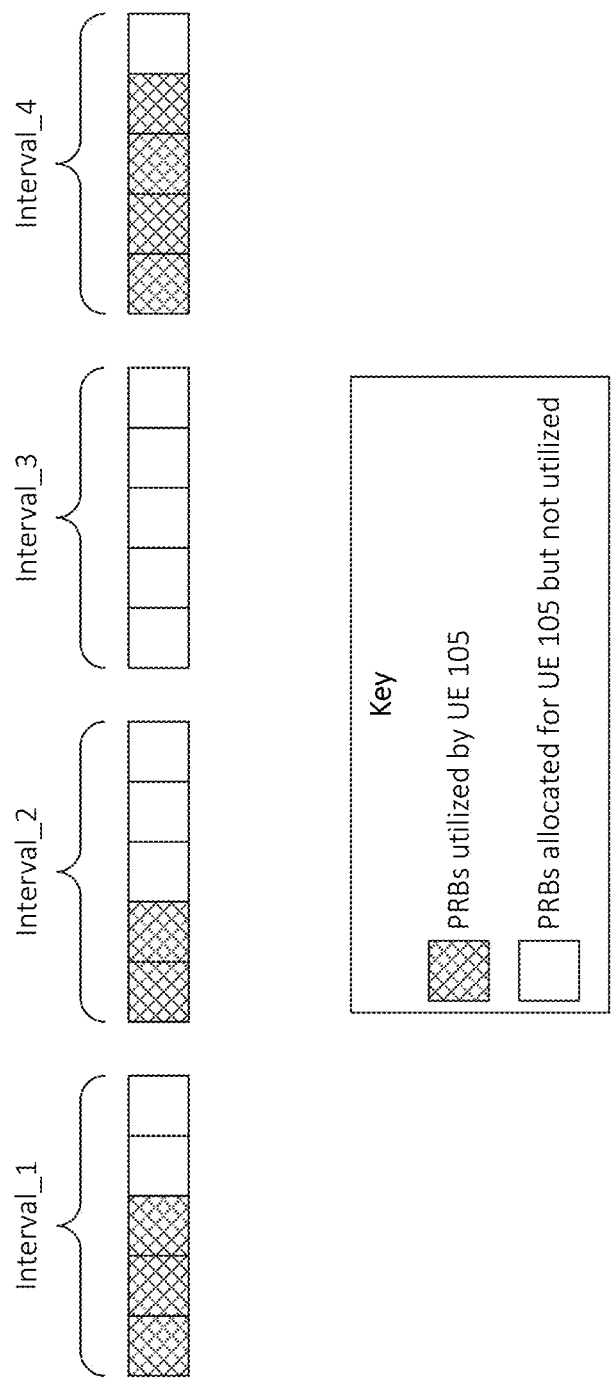
FIG. 4 illustrates an example of determining radio resource utilization associated with a particular set of resource allocation parameters, in accordance with some embodiments.

Returning to FIG. 2, UE 105 may also determine a measure of resource utilization associated with communications between base station 103 and UE 105. For example, UE 105 may compare an amount of resources utilized for uplink and/or downlink traffic to an amount of resources allocated for uplink and/or downlink traffic. As shown in FIG. 4, for example, UE 105 may be allocated a particular set of PRBs, where each PRB may be associated with a time and/or frequency domain set of resources in a cyclical manner. The set of PRBs allocated for UE 105 is represented as five blocks, where each block may be utilized or not utilized on a given interval. Interval_1, Interval_2, Interval_3, and Interval_4, shown in FIG. 4, may be particular intervals monitored (at 208) by UE 105 to determine a measure of resource utilization at such intervals. As noted above, the resources allocated to UE 105 may include different types of channels, such as uplink channels, downlink channels, control channels, user plane channels, etc. The blocks in FIG. 4 may represent some or all of these channels.

As further indicated in the figure, shaded blocks represent resources utilized by UE 105 (e.g., where such resources are used to carry uplink and/or downlink traffic from and/or to UE 105), while blank blocks represent resources allocated to (e.g., available for) uplink and/or downlink traffic associated with UE 105, but not used for such traffic.

Thus, at Interval_1, the utilization may be 60% (represented by three out of five blocks being shaded), the utilization at Interval_2 may be 40%, the utilization at Interval_3 may be 0%, and the utilization at Interval_4 may be 80%. In some embodiments, the utilization may be determined using some other type of computation and/or level of granularity, such as utilization determined on a per-channel basis, a per-channel type basis (e.g., control channel, user plane channel, uplink channel, downlink channel, etc.), and/or on some other basis.

Returning to FIG. 2, UE 105 may generate (at 208) a performance and/or efficiency score (referred to herein as "efficiency score" for the sake of brevity) based on the monitored efficiency metrics. In some embodiments, UE 105 may utilize one or more weights for different types of efficiency metrics, such as a higher weight for delay metrics than for utilization metrics, or vice versa. In some embodiments, such weights may be provided by CPOS 101 and/or some other device or system to UE 105 via an API or other suitable communication pathway. For example, UE 105 may execute a client application that communicates with CPOS 101, CPOS 101 may provide the weights as part of a system update or firmware of UE 105, etc. CPOS 101 may determine or adjust such weights using modeling such as AI/ML techniques or other suitable techniques.

UE 105 may provide (at 210) the efficiency score to CPOS 101. For example, UE 105 may provide the efficiency score to CPOS 101 via an API or other suitable communication pathway, and/or may provide the efficiency score to base station 103, which may relay the efficiency score to CPOS 101 via an API or other suitable communicate pathway. In some such embodiments, UE 105 may provide the efficiency score to base station 103 via an RRC message or other suitable control message, with an indicator or flag indicating that the message includes an efficiency score. Base station 103 may be configured to relay scores, provided with such indicators or flags, to CPOS 101 (e.g., with an identifier of UE 105, such as a Subscription Permanent Identifier ("SUPI"), a Globally Unique Temporary Identifier ("GUTI"), an Internet Protocol ("IP") address, and/or some other suitable identifier of UE 105).

CPOS 101 may determine (at 212) updated channel parameters for UE 105 based on the received efficiency score. The updated channel parameters may be, for example, a modification to a previous set of channel parameters provided (e.g., at 102) by CPOS 101. In some embodiments, the updated channel parameters may be determined independently of the previous set of channel parameters. In some embodiments, CPOS 101 may use modeling such as AI/ML techniques to refine or otherwise modify the previous set of channel parameters based on the received efficiency score. For example, CPOS 101 may determine whether this score is higher than a previously received efficiency score, which may indicate that the channel parameters associated with such score are more optimal than a previous set of channel parameters. In some embodiments, CPOS 101 may utilize deep learning, one or more stochastic batch gradients, neural networks, and/or other suitable functions to determine whether the channel parameters associated with the received efficiency score are more optimal than channel parameters associated with other efficiency scores. For example, such operations may be used to iteratively modify channel parameters to increase a ratio of UEs 105 exhibiting channel parameters with higher efficiency or performance metrics (and/or other measures, scores, or thresholds) as opposed to channel parameters of other iterations. In this manner, CPOS 101 may adjust, refine, etc. the channel parameters in an ongoing basis, in order to identify an optimal set (e.g., associated with the highest efficiency score) of channel parameters.

Once CPOS 101 determines (at 212) an updated set of channel parameters, CPOS 101 may provide (at 214) the updated set of channel parameters to 103. As similarly noted above, base station 103 may implement the updated set of channel parameters and may provide the updated set of channel parameters to UE 105. UE 105 may monitor efficiency metrics associated with the updated set of channel parameters, may generate an updated efficiency score, and may provide the updated efficiency score to CPOS 101, which may continue to evaluate and refine the channel parameters as discussed above.

Figure 5:
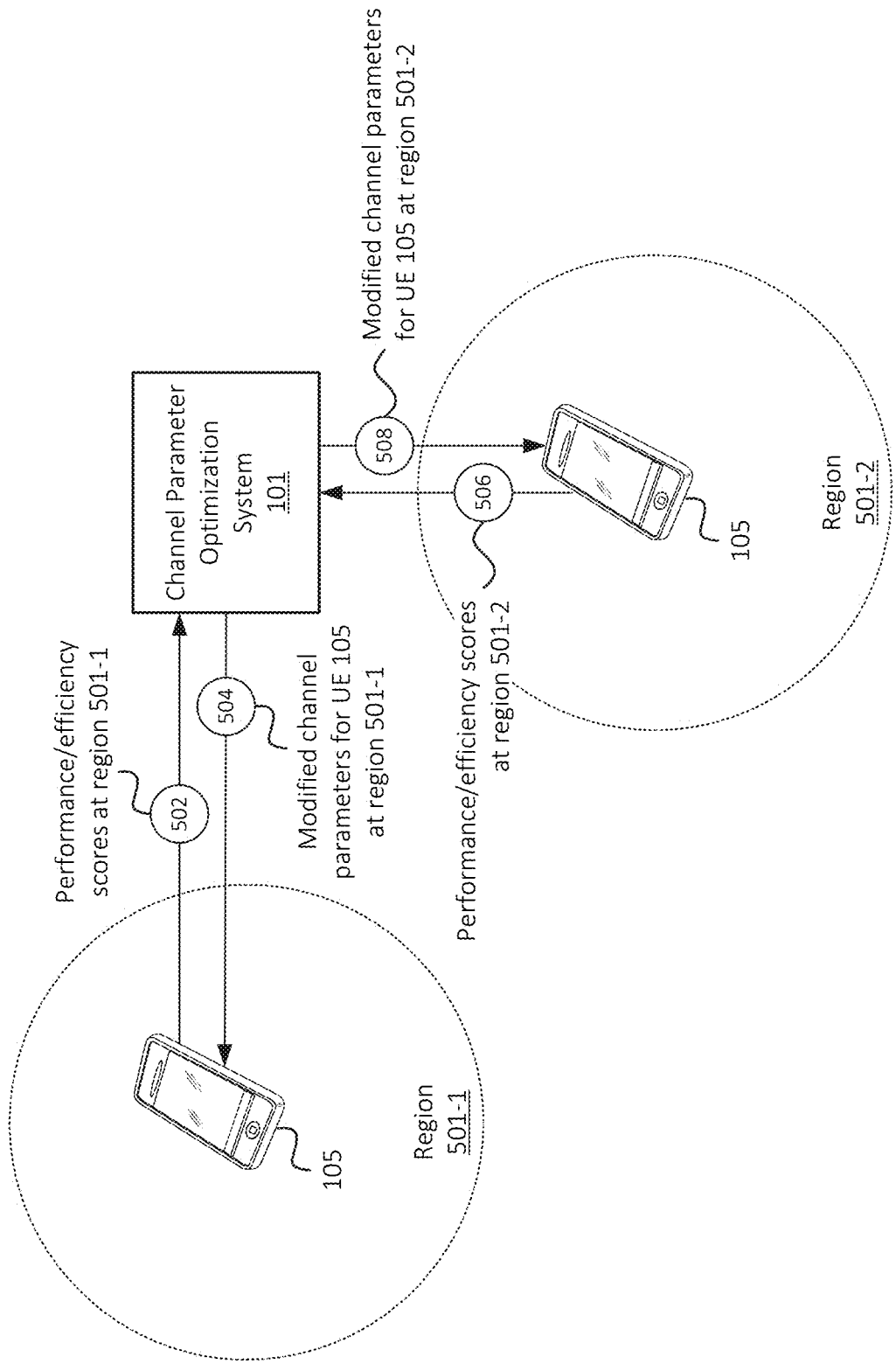
FIGS. 5-8 illustrate examples of optimizing channel parameters for different groups of UEs and/or other factors, in accordance with some embodiments.

As noted above, channel parameters may be determined or maintained on the basis of one or more factors. As described with respect to FIGS. 5-8, such factors may include geographical location, time and/or seasonality, network load metrics, device group or category, and/or one or more other factors. As shown in FIG. 5, for example, CPOS 101 may receive (at 502) efficiency scores from UE 105 (and/or one or more other UEs) that is located in a first geographical region 501-1. As similarly discussed above, CPOS 101 may determine modified channel parameters for UE 105 based on the provided (at 502) efficiency scores, and may provide (at 504) the modified channel parameters to UE 105 and/or to one or more base stations to which UE 105 is connected. Further, CPOS 101 may provide such channel parameters to other UEs that are located in geographical region 501-1 and/or in regions with similar attributes as geographical region 501-1. Such attributes may include geographical topology, building density, air particulate matter concentration, and/or other region-based attributes.

Similarly, CPOS 101 may receive (at 506) from UE 105 (and/or one or more other UEs) that is located in a second geographical region 501-2. CPOS 101 may determine modified channel parameters for UE 105 based on the provided (at 506) efficiency scores, and may provide (at 508) the modified channel parameters to UE 105 and/or to one or more base stations to which UE 105 is connected. Further, CPOS 101 may provide such channel parameters to other UEs that are located in geographical region 501-2 and/or in regions with similar attributes as geographical region 501-2.

Figure 6:
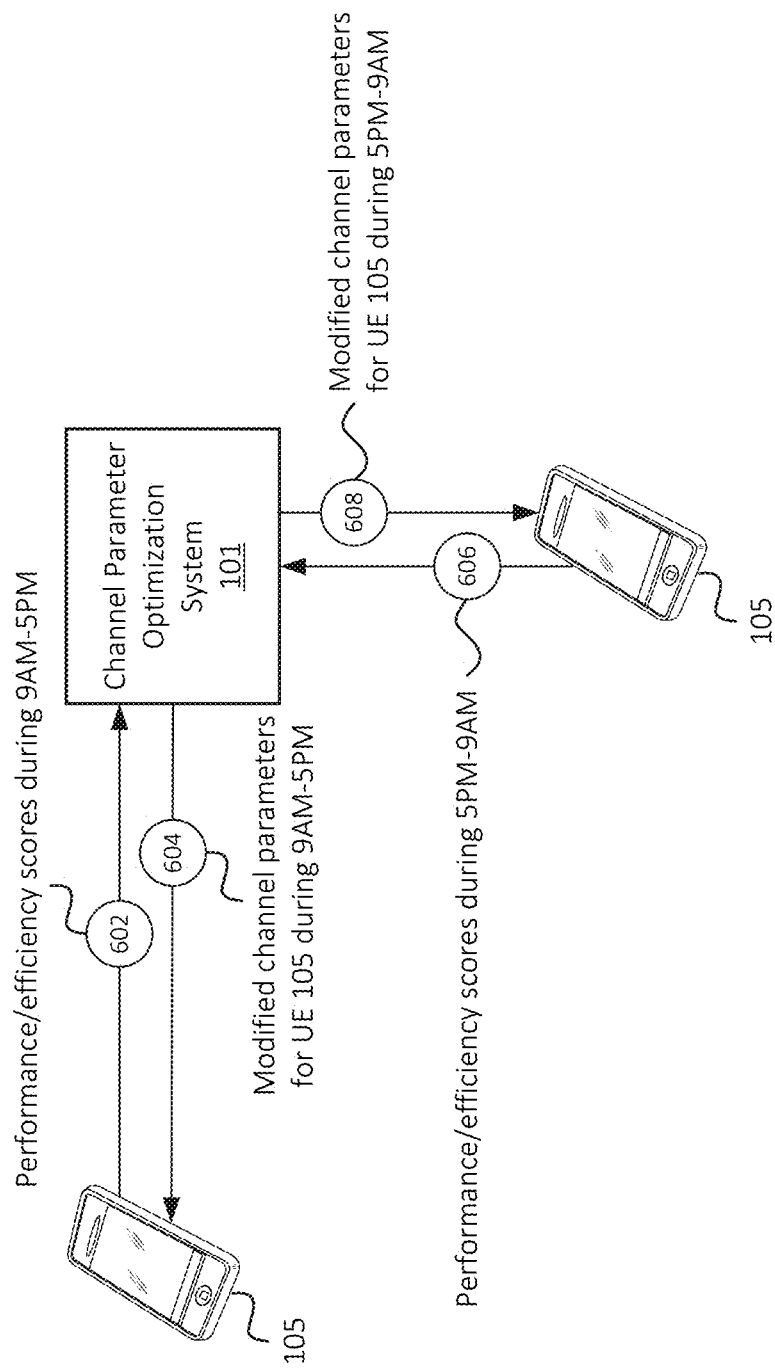

As shown in FIG. 6, CPOS 101 may receive (at 602) efficiency scores from UE 105 (and/or one or more other UEs) during a first time window (e.g., 9 AM through 5 PM). CPOS 101 may determine modified channel parameters for UE 105 based on the provided (at 602) efficiency scores, and may provide (at 604) the modified channel parameters to UE 105 and/or to one or more base stations to which UE 105 is connected. Further, CPOS 101 may provide such channel parameters to other UEs during the first time window. In some embodiments, the time window may indicate days of the week, holidays, seasons, and/or other temporal indicators.

CPOS 101 may further receive (at 606) efficiency scores from UE 105 (and/or one or more other UEs) during a second time window (e.g., 5 PM through 9 AM). CPOS 101 may determine modified channel parameters for UE 105 based on the provided (at 606) efficiency scores, and may provide (at 608) the modified channel parameters to UE 105 and/or to one or more base stations to which UE 105 is connected. Further, CPOS 101 may provide such channel parameters to other UEs during the second time window.

Figure 7:
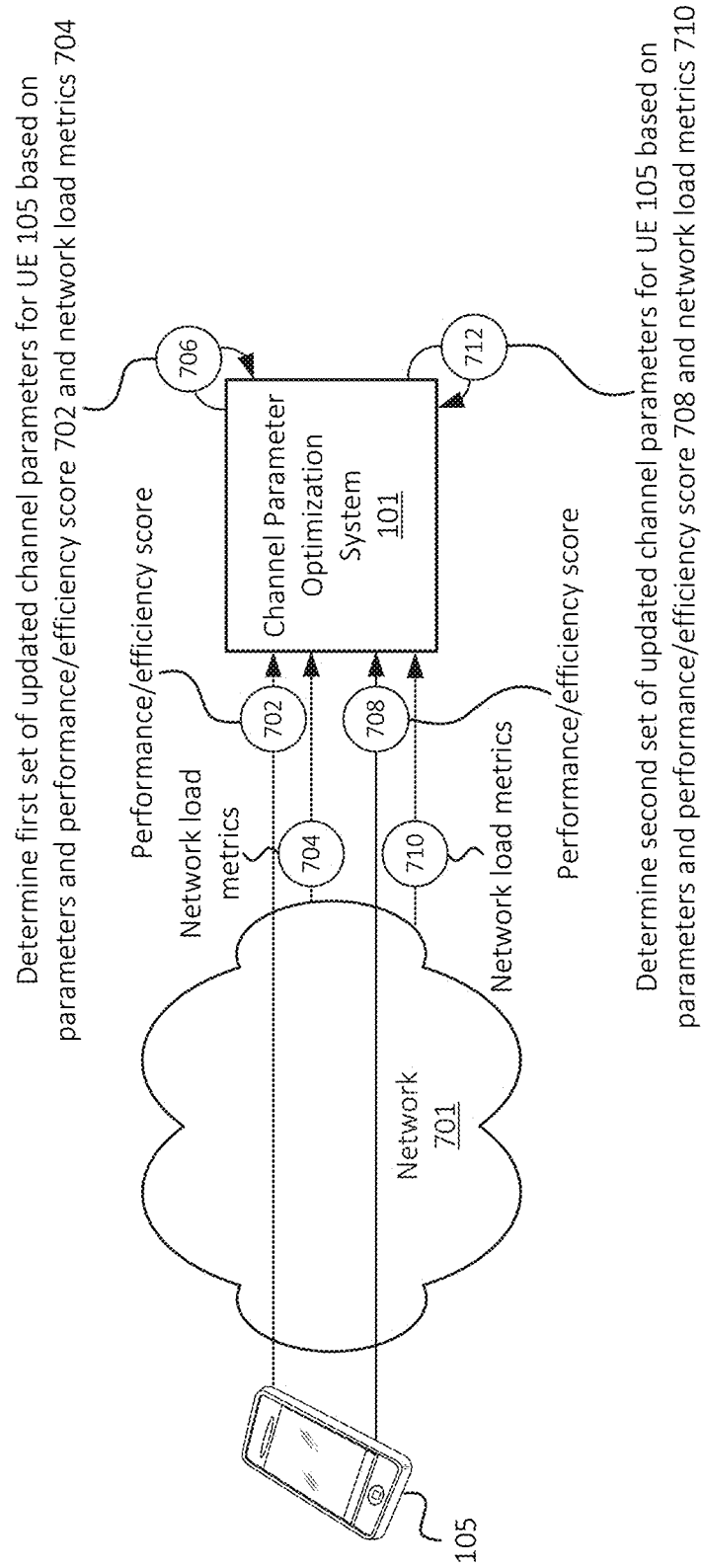

As shown in FIG. 7, CPOS 101 may receive (at 702) efficiency scores from UE 105 (and/or one or more other UEs) that are connected to a particular network 701. Network 701 may be, or may represent, a RAN associated with a wireless network, a portion of a RAN associated with a wireless network, and/or some other portion of a network with which UE 105 communicates. CPOS 101 may further receive (at 704) network load metrics associated with network 701. For example, CPOS 101 may communicate with one or more devices or systems that monitor and/or provide such metrics. CPOS 101 may communicate with such devices via an API, via a Service Capability Exposure Function ("SCEF") or Network Exposure Function ("NEF") associated with network 701, and/or via some other suitable pathway. The network load metrics may include or may be based on a quantity of connected UEs, an amount of available or consumed network resources, a measure of queue depth or processing delay, and/or other suitable network load metrics.

CPOS 101 may determine (at 706) a first set of updated channel parameters for UE 105 based on the efficiency score (received at 702) as well as the network load metrics (received at 704). For example, situations may arise where CPOS 101 identifies that different network load metrics may be a factor that affects or is otherwise correlated to the efficiency score, and different channel parameters may thus be appropriate when different network load metrics are present.

For example, CPOS 101 may subsequently receive (at 708) updated efficiency scores from UE 105 while UE 105 remains connected to network 701. CPOS 101 may also receive (at 710) updated network load metrics. CPOS 101 may accordingly determine (at 712) a second set of channel parameters based on the efficiency score (received at 708) as well as the network load metrics (received at 710). As noted above, the second set of channel parameters may be different from the first set of channel parameters due to the updated efficiency score (received at 708), the updated network load metrics (received at 710), or both being different from the previously received (at 702 and/or 704) efficiency score and/or network load metrics. In this manner, multiple factors or levels of granularity may be used in determining updated channel parameters, in some embodiments.

Figure 8:
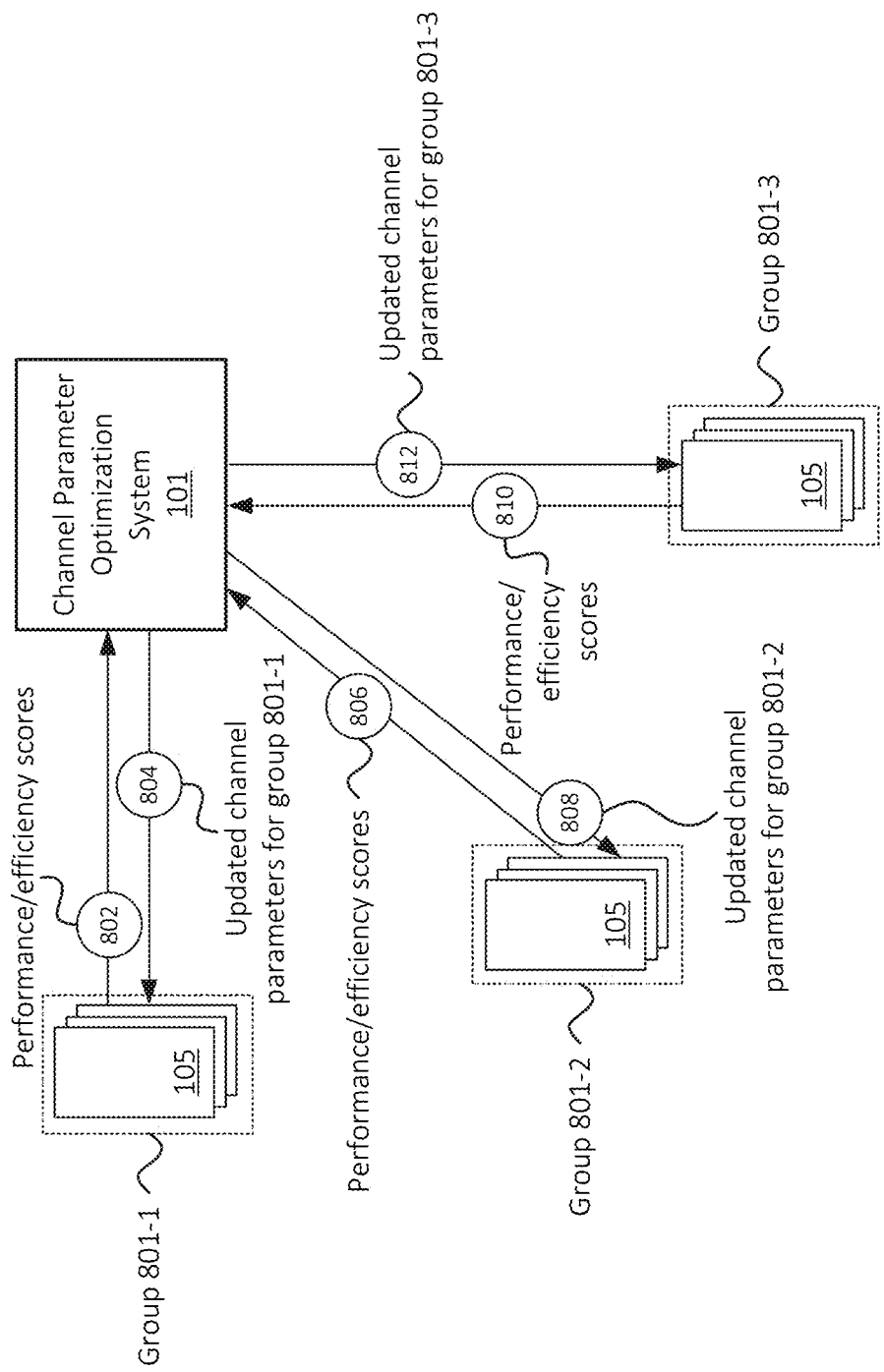

As another example, as shown in FIG. 8, UEs 105 may be associated with different groups 801, where such groups may be different organizations or user groups, different UE types, different makes and/or models of UEs, categories or labels such as "first responder" or "enterprise user," etc. CPOS 101 may receive group information from an information repository associated with a wireless network such as a Unified Data Management function ("UDM"), an Home Subscriber Server ("HSS"), or other suitable information repository.

As shown, CPOS 101 may receive (at 802, 806, and 810) efficiency scores associated with groups 801-1, 801-2, and 801-3, respectively. CPOS 101 may provide (at 804, 808, and 812) respective channel parameters for the different groups 801-1, 801-2, and 801-3 based on the respective scores for the groups. Similarly, CPOS 101 may provide a particular set of channel parameters, associated with a particular group 801, to one or more UEs 105 associated with the particular group 801 without necessarily receiving efficiency scores from such UEs 105 (e.g., based on efficiency scores received from other UEs of the same group 801).

Figure 9:
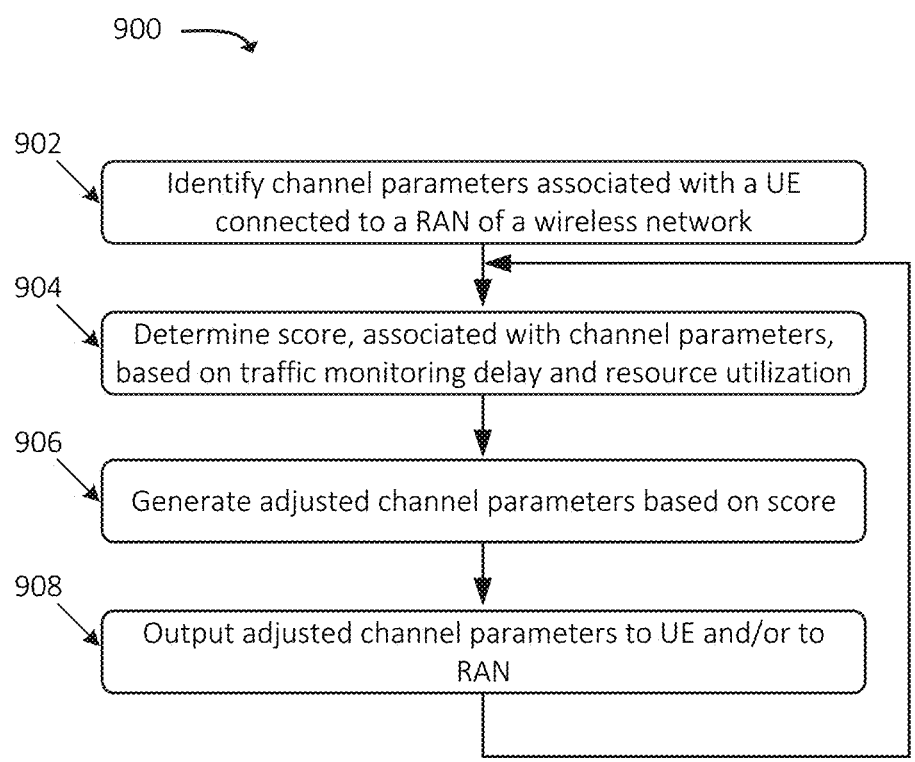
FIG. 9 illustrates an example process for iteratively refining channel parameters based on traffic monitoring delay and resource utilization, in accordance with some embodiments.

FIG. 9 illustrates an example process 900 for iteratively refining channel parameters based on traffic monitoring delay and resource utilization. In some embodiments, some or all of process 900 may be performed by CPOS 101. In some embodiments, one or more other devices may perform some or all of process 900 in concert with, and/or in lieu of, CPOS 101.

As shown, process 900 may include identifying (at 902) channel parameters associated with a particular UE 105 connected to a RAN of a wireless network (e.g., connected to one or more base stations 103). For example, CPOS 101 may receive the channel parameters from base station 103 and/or some other device or system, may have generated or refined the channel parameters in an iterative process as described herein, may identify a "default" set of channel parameters, etc.

As discussed above, the channel parameters may include monitoring and/or timing parameters, specifying time intervals and/or otherwise specifying when traffic may be communicated between base station 103 and UE 105. In some embodiments, the time intervals may be specified in terms of an ON duration and an OFF duration, and/or may be specified in some other suitable manner. The channel parameters may also include resource allocation parameters, which may specify a measure or arrangement of radio resources (e.g., physical or radio frequency ("RF") resources), such as PRBs, that are allocated for (e.g., available for) traffic to be communicated between base station 103 and UE 105.

Process 900 may further include determining (at 904) a score, associated with the channel parameters, based on a measure of traffic monitoring delay and/or a measure of resource utilization. For example, as discussed above, the traffic monitoring delay may be based on an identification (e.g., by UE 105, by CPOS 101, and/or some other device or system) of instances of traffic being available for UE 105 (e.g., uplink traffic to be sent from UE 105 or downlink traffic to be sent to UE 105) at the beginning of a given timing interval. For example, such traffic may be available "at the beginning" when the traffic is available within a threshold duration of time after the beginning of an ON duration (e.g., within 1 ms of the start of the ON duration), is available during the first time slot of the ON duration (e.g., in embodiments where the ON duration is expressed or represented as a quantity of time slots), and/or otherwise may have potentially been available during the preceding OFF duration.

The measure of resource utilization may be based on a quantity or proportion of allocated resources that were utilized to carry traffic between base station 103 and UE 105. For example, in situations where the amount of traffic is less than the allocated resources in a given time period, the difference between the amount of traffic and the allocated resources may be considered as unutilized resources, while the resources used to carry the traffic during the time period may be considered as utilized resources.

In some embodiments, UE 105 may generate the score. In some embodiments, UE 105 may provide information to CPOS 101, based on which CPOS 101 may generate the score. For example, UE 105 may report a quantity of instances in a given timeframe that traffic was communicated at the beginning of an ON duration, one or more measures of resource utilization during the timeframe, etc., based on which CPOS 101 may generate the score. As discussed above, the score may be based on one or more other factors, such as network load and/or other factors. As also discussed above, the score may be based on one or more weights, where different factors are weighted differently. In some embodiments, CPOS 101 may adjust such weights using AI/ML techniques or other suitable techniques.

Process 900 may additionally include generating (at 906) adjusted channel parameters based on the score, and outputting (at 908) the adjusted channel parameters. For example, CPOS 101 may determine different monitoring and/or timing parameters (e.g., a different ON duration and/or a different OFF duration) and/or a different resource allocation for communications between UE 105 and base station 103, and provide such adjusted channel parameters to base station 103 and/or UE 105, such that base station 103 and UE 105 may communicate using the adjusted parameters (e.g., in lieu of the previous channel parameters). In some embodiments, the different resource allocation (e.g., BP parameters) may include allocating additional resources to UE 105, such as when resource utilization associated with UE 105 has been relatively high based on the previous set of channel parameters. On the other hand, the different resource allocation may include allocating fewer resources to UE 105, such as in situations where resource utilization associated with UE 105 has been relatively low based on the previous set of channel parameters.

CPOS 101 may make such modifications based on, for example, an iterative process in which some or all of process 900 (e.g., operations 904-908) is repeated in a manner that optimizes the traffic monitoring delay and the resource utilization (e.g., reduces traffic monitoring delay and/or increases resource utilization). For example, CPOS 101 may make such modifications such that the score (generated at 906) is increased (e.g., compared to previous modifications associated with previous iterations), reaches at least a threshold level, and/or is otherwise optimized.

Figure 10:
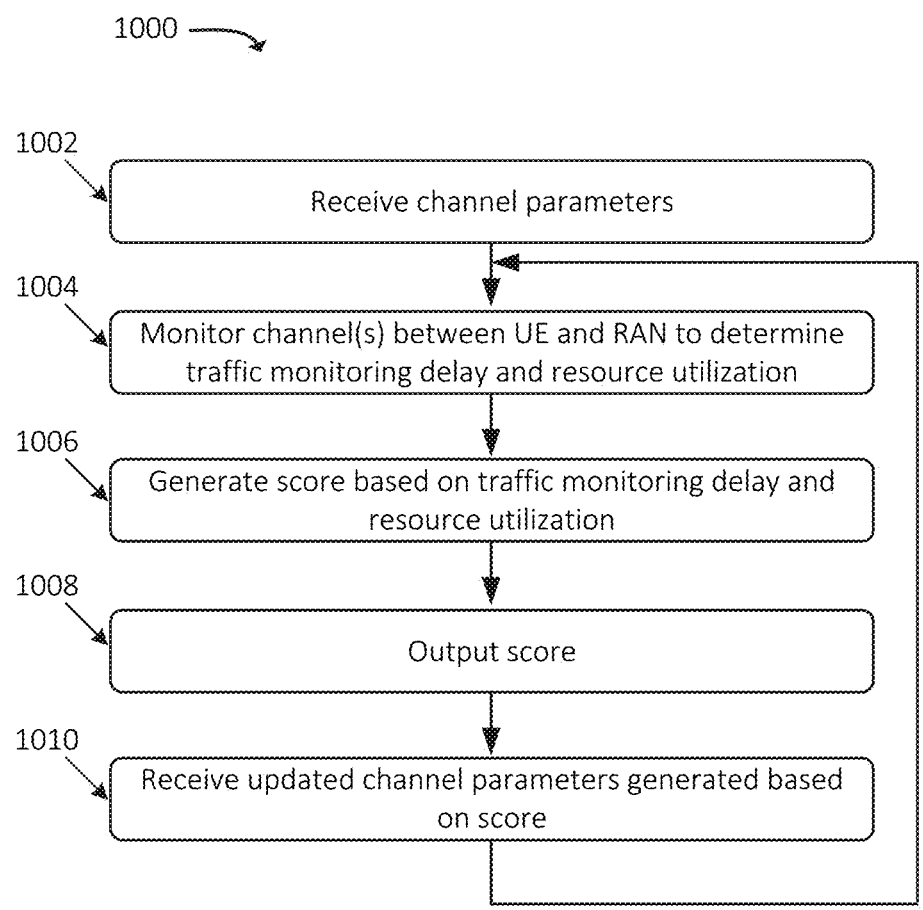
FIG. 10 illustrates an example process for determining traffic monitoring delay and resource utilization at a UE based on a set of channel parameters, in accordance with some embodiments.

FIG. 10 illustrates an example process 1000 for determining, over time, traffic monitoring delay and resource utilization based on a set of channel parameters. In some embodiments, some or all of process 1000 may be performed by UE 105.

As shown, process 1000 may include receiving (at 1002) a set of channel parameters. For example, as discussed above, UE 105 may receive such channel parameters from a RAN (e.g., from base station 103 via RRC signaling or other suitable signaling or messaging) and/or from CPOS 101 (e.g., via one or more APIs or other suitable communication pathways). The channel parameters may include monitoring and/or timing parameters, resource allocation parameters, and/or other suitable parameters. UE 105 may communicate with base station 103 using such parameters, such as by implementing an ON duration and an OFF duration based on the monitoring and/or timing parameters, configuring one or more uplink traffic queues based on the resource allocation parameters, etc.

Process 1000 may also include monitoring (at 1004) one or more channels between UE 105 and the RAN to determine a measure of traffic monitoring delay and/or resource utilization. For example, as similarly described above, UE 105 may identify instances at which traffic was sent or received at the beginning of an ON duration or other suitable type of traffic communication window. Further, UE 105 may identify a measure of utilization of radio resources allocated for communications between UE 105 and the RAN.

Process 1000 may further include generating (at 1006) a score based on the traffic monitoring delay and/or resource utilization. For example, as discussed above, UE 105 (or, in some embodiments, CPOS 101 or some other device or system) may generate a score based on the traffic monitoring delay and/or resource utilization (monitored at 1004). As discussed above, the score may be based on different weights for the traffic monitoring delay, resource utilization, and/or other factors. In this manner, traffic monitoring delay, and resource utilization, and/or other factors may be taken more or less heavily in consideration when determining an optimal set of channel parameters. In other words, the channel parameters may be optimized based on different maximizing different measures of yield and/or performance considerations, such as reducing latency (e.g., which may be introduced by excessive traffic monitoring delay), decreasing service interruptions which may result from modifying resource allocations, increasing network efficiency by maximizing resource utilization, etc.

Process 1000 may additionally include outputting (at 1008) the score. For example, UE 105 may output the score to CPOS 101. In some embodiments, as noted above, UE 105 may output monitored information (e.g., traffic monitoring delay and/or resource utilization information) to CPOS 101, which may generate the score. CPOS 101 may, as discussed above, generate updated channel parameters based on the score.

Process 1000 may also include receiving (at 1010) the updated channel parameters generated based on the score. For example, UE 105 may receive the updated channel parameters from CPOS 101, base station 103, or some other source. UE 105 may implement the updated channel parameters by, for example, using a different set of ON or OFF durations to communicate with base station 103, may queue traffic differently based on the updated resource allocation parameters, etc.

As discussed above, some or all of process 1000 may be repeated in an iterative manner, such that an optimal set of channel parameters may be determined. As also noted above, different groupings or levels of granularity may be used in determining various sets of channel parameters to apply in different situations, such as for different groups or categories of UEs, different geographical locations, different network conditions, etc. As such, the channel parameters may be provided to UEs sharing similar attributes (e.g., make and/or model, geographical location, experiencing particular network conditions, etc.) as UEs for which optimal sets of channel parameters were determined. In this manner, optimal channel parameters may be proactively provided to such UEs without the need for the UEs to perform the monitoring and/or score generation discussed above.

Figure 11:
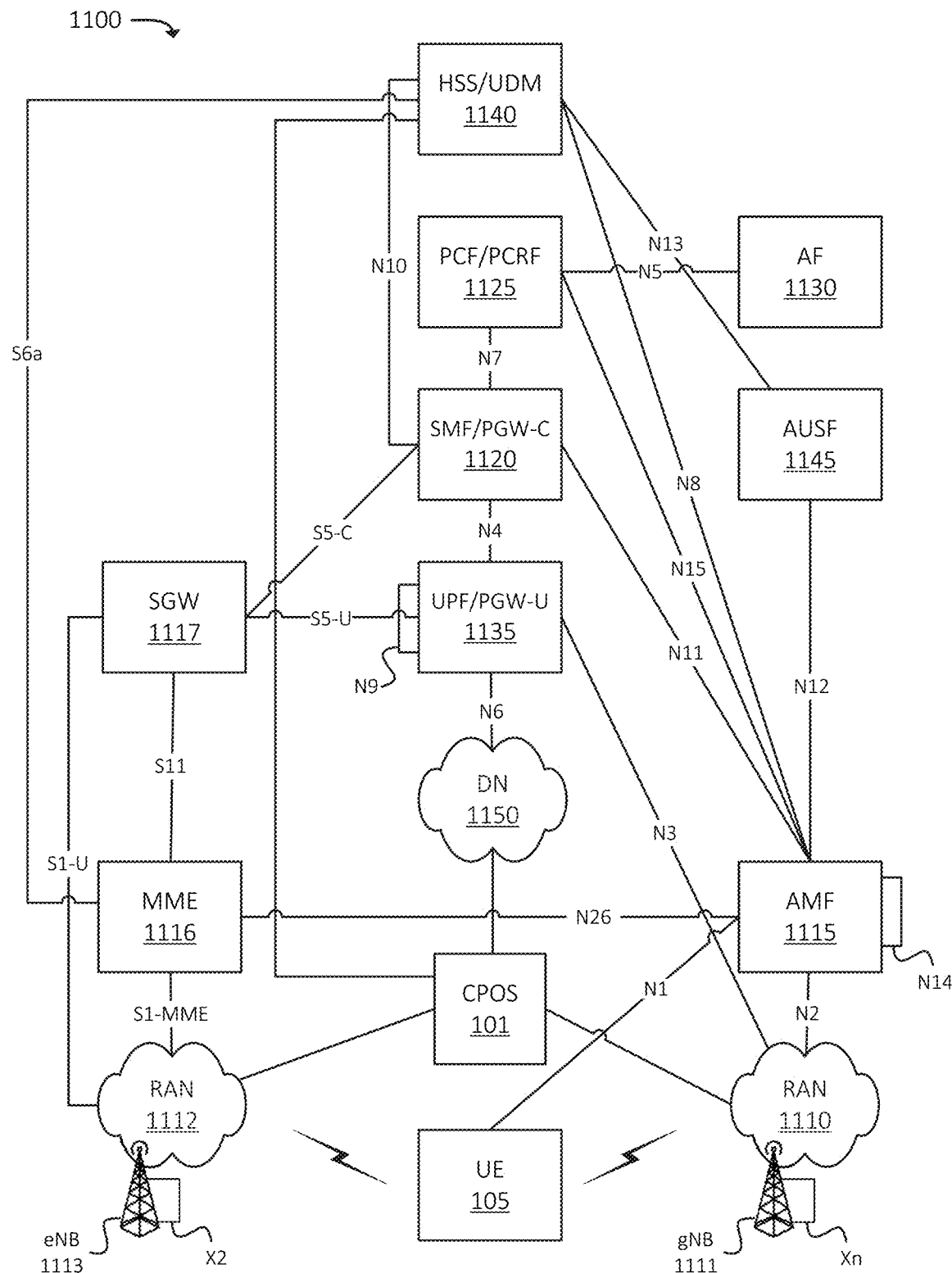
FIG. 11 illustrates an example environment in which one or more embodiments, described herein, may be implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 105, RAN 1110 (which may include one or more Next Generation Node Bs ("gNBs") 1111), RAN 1112 (which may include one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, HSS/UDM 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as CPOS 101.

The example shown in FIG. 11 illustrates one instance of each network component or function (e.g., one instance of SMF/PGW-C 1120, PCF/PCRF 1125, UPF/PGW-U 1135, HSS/UDM 1140, and/or AUSF 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or AUSF 1145, while another slice may include a second instance of SMF/PGW-C 1120, PCF/PCRF 1125, UPF/PGW-U 1135, HSS/UDM 1140, and/or AUSF 1145). The different slices may provide differentiated levels of service, such as service in accordance with different QoS parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively, or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 105 may include a computation and communication device, such as a wireless mobile communication device that is capable of communicating with RAN 1110, RAN 1112, and/or DN 1150. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 105 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 105 may communicate with one or more other elements of environment 1100. UE 105 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 105 via the air interface, and may communicate the traffic to UPF/PGW-U 1135, and/or one or more other devices or networks. Similarly, RAN 1110 may receive traffic intended for UE 105 (e.g., from UPF/PGW-U 1135, AMF 1115, and/or one or more other devices or networks) and may communicate the traffic to UE 105 via the air interface. In some embodiments, base station 103 may be, may include, and/or may be implemented by one or more gNBs 1111.

RAN 1112 may be, or may include, a LTE RAN that includes one or more base stations (e.g., one or more eNBs 1113), via which UE 105 may communicate with one or more other elements of environment 1100. UE 105 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 105 via the air interface, and may communicate the traffic to UPF/PGW-U 1135, and/or one or more other devices or networks. Similarly, RAN 1110 may receive traffic intended for UE 105 (e.g., from UPF/PGW-U 1135, SGW 1117, and/or one or more other devices or networks) and may communicate the traffic to UE 105 via the air interface. In some embodiments, base station 103 may be, may include, and/or may be implemented by one or more eNBs 1113.

AMF 1115 may include one or more devices, systems, Virtualized Network Functions ("VNFs"), Cloud-Native Network Functions ("CNFs"), etc., that perform operations to register UE 105 with the 5G network, to establish bearer channels associated with a session with UE 105, to hand off UE 105 from the 5G network to another network, to hand off UE 105 from the other network to the 5G network, manage mobility of UE 105 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, CNFs, etc., that perform operations to register UE 105 with the EPC, to establish bearer channels associated with a session with UE 105, to hand off UE 105 from the EPC to another network, to hand off UE 105 from another network to the EPC, manage mobility of UE 105 between RANs 1112 and/or eNBs 1113, and/or to perform other operations.

SGW 1117 may include one or more devices, systems, VNFs, CNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, CNFs, etc., that gather, process, store, and/or provide information in a manner described herein. SMF/PGW-C 1120 may, for example, facilitate the establishment of communication sessions on behalf of UE 105. In some embodiments, the establishment of communications sessions may be performed in accordance with one or more policies provided by PCF/PCRF 1125.

PCF/PCRF 1125 may include one or more devices, systems, VNFs, CNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, CNFs, etc., that receive, store, and/or provide information that may be used in determining parameters (e.g., quality of service parameters, charging parameters, or the like) for certain applications.

UPF/PGW-U 1135 may include one or more devices, systems, VNFs, CNFs, etc., that receive, store, and/or provide data (e.g., user plane data). For example, UPF/PGW-U 1135 may receive user plane data (e.g., voice call traffic, data traffic, etc.), destined for UE 105, from DN 1150, and may forward the user plane data toward UE 105 (e.g., via RAN 1110, SMF/PGW-C 1120, and/or one or more other devices). In some embodiments, multiple UPFs 1135 may be deployed (e.g., in different geographical locations), and the delivery of content to UE 105 may be coordinated via the N9 interface (e.g., as denoted in FIG. 11 by the line marked "N9" originating and terminating at UPF/PGW-U 1135). Similarly, UPF/PGW-U 1135 may receive traffic from UE 105 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, CNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 105.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 105 may communicate, through DN 1150, with data servers, other UEs 105, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 105 may communicate.

Figure 12:
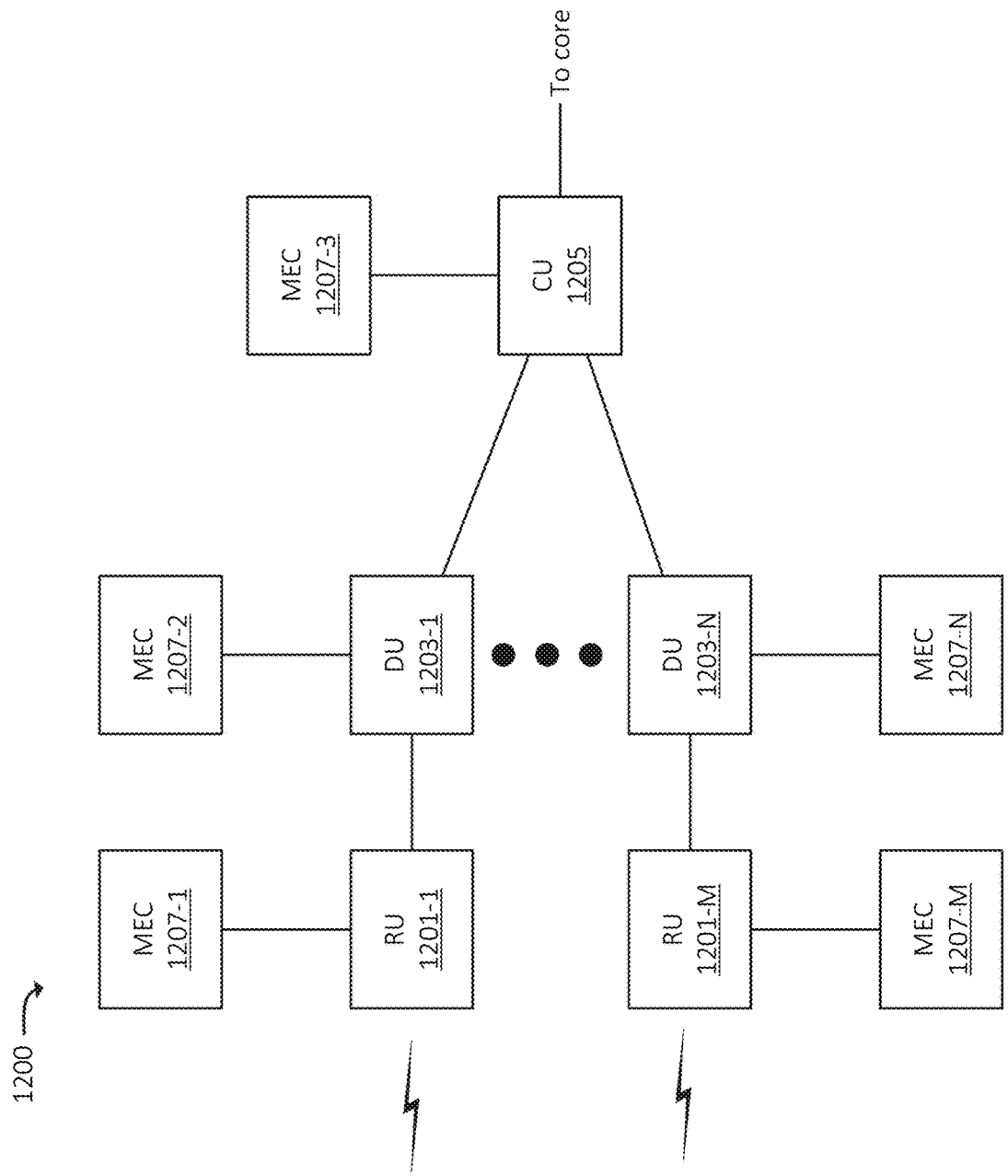
FIG. 12 illustrates an example arrangement of a radio access network ("RAN"), in accordance with some embodiments.

FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 105 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 105, and may determine which DU(s) 1203 should receive the downlink traffic. DU 1203 may include one or more devices that transmit traffic between a core network (e.g., via CU 1205) and UE 105 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 105.

RU 1201 may include hardware circuitry (e.g., one or more RF transceivers, antennas, radios, and/or other suitable hardware) to communicate wirelessly (e.g., via an RF interface) with one or more UEs 105, one or more other DUs 1203 (e.g., via RUs 1201 associated with DUs 1203), and/or any other suitable type of device. In the uplink direction, RU 1201 may receive traffic from UE 105 and/or another DU 1203 via the RF interface and may provide the traffic to DU 1203. In the downlink direction, RU 1201 may receive traffic from DU 1203, and may provide the traffic to UE 105 and/or another DU 1203.

RUs 1201 may, in some embodiments, be communicatively coupled to one or more Multi-Access/Mobile Edge Computing ("MEC") devices, referred to sometimes herein simply as "MECs" 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 105, via a respective RU 1201.

For example, RU 1201-1 may route some traffic, from UE 105, to MEC 1207-1 instead of to a core network (e.g., via DU 1203 and CU 1205). MEC 1207-1 may process the traffic, perform one or more computations based on the received traffic, and may provide traffic to UE 105 via RU 1201-1. In this manner, ultra-low latency services may be provided to UE 105, as traffic does not need to traverse DU 1203, CU 1205, and an intervening backhaul network between DU network 1200 and the core network. In some embodiments, MEC 1207 may include, and/or may implement, some or all of the functionality described above with respect to CPOS 101, UPF 1135, and/or one or more other devices, systems, VNFs, CNFs, etc.

Figure 13:
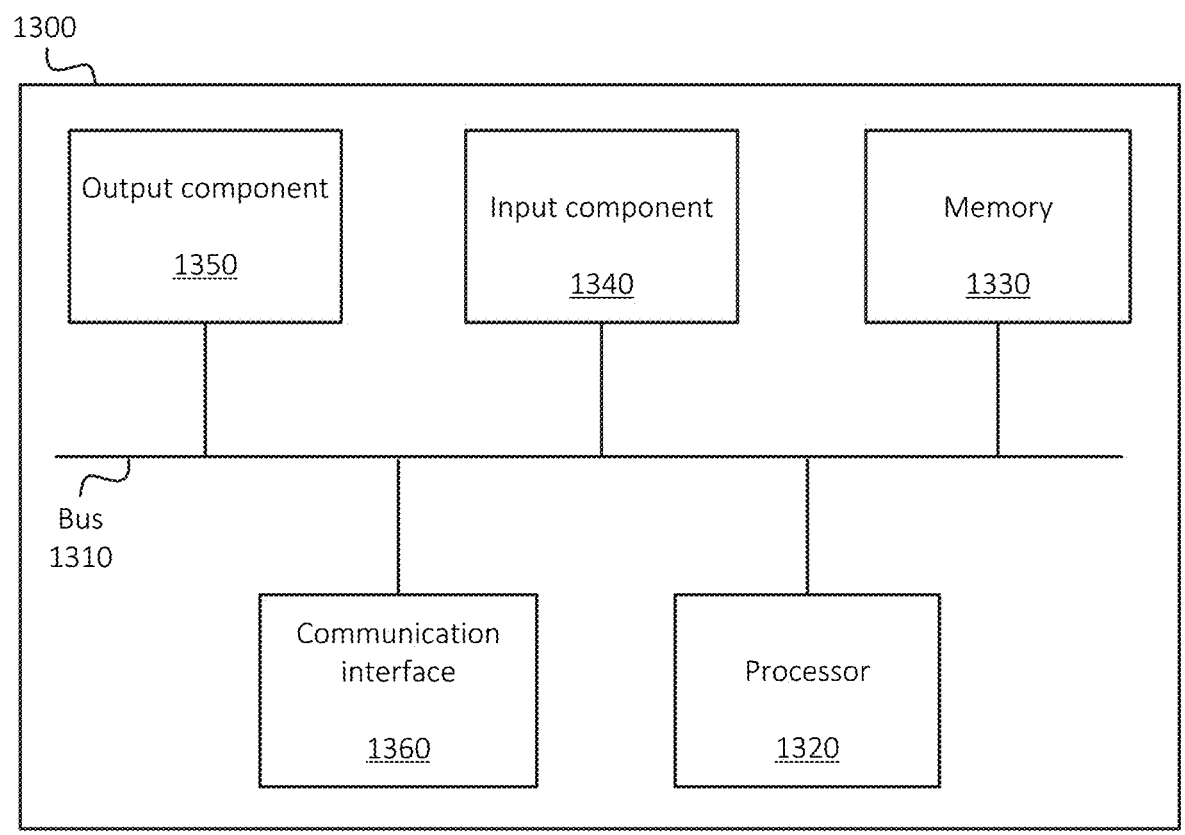
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. In some embodiments, processor 1320 may be or may include one or more hardware processors. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a first set of timing parameters associated with a User Equipment ("UE") connected to a radio access network ("RAN") of a wireless network, wherein the first set of timing parameters indicate time intervals at which traffic is able to be wirelessly communicated between the UE and the RAN, and
determine a quantity of instances that traffic was communicated between the UE and the RAN at a beginning of one or more time intervals, indicated by the first set of timing parameters; and
generate a second set of timing parameters based on the quantity of instances that traffic was communicated between the UE and the RAN at the beginning of the one or more time intervals,
wherein the UE and the RAN communicate using the second set of timing parameters in lieu of the first set of timing parameters.

2. The device of claim 1, wherein the one or more processors are further configured to:
generate one or more scores based on:
the determined quantity of instances that traffic was communicated between the UE and the RAN at the beginning of the one or more time intervals, and
one or more additional factors,
wherein generating the second set of timing parameters is further based on the generated one or more scores.

3. The device of claim 1, wherein the UE is a first UE, wherein the one or more processors are further configured to:
determine that the first UE and a second UE are associated with a same category; and
associate the second UE with the second set of timing parameters based on determining that the first UE and the second UE are associated with the same category.

4. The device of claim 1, wherein the UE determines the quantity of instances that traffic was communicated between the UE and the RAN at the beginning of the one or more time intervals.

5. The device of claim 1, wherein the quantity of instances that traffic was communicated at the beginning of the one or more time intervals includes:
   a quantity of instances that traffic was communicated within a threshold period of time after the beginning of the one or more time intervals.

6. The device of claim 1, wherein the first set of timing parameters specify:
   an ON duration during which traffic is able to be wirelessly communicated between the UE and the RAN, and
   an OFF duration during which traffic is not able to be wirelessly communicated between the UE and the RAN,
   wherein the quantity of instances that traffic was communicated at the beginning of the one or more time intervals includes a quantity of instances that traffic was communicated within a threshold period of time after the beginning of one or more ON durations.

7. The device of claim 6, wherein the one or more processors are further configured to:
   determine a measure of delay for each instance of traffic that was communicated between the UE and the RAN at the beginning of the one or more ON durations,
   wherein generating the second set of timing parameters is further based on the determined measure of delay for each instance of traffic that was communicated between the UE and the RAN at the beginning of the one or more ON durations.

8. A non-transitory computer-readable medium, storing a plurality of processor-executable instructions to:
   identify a first set of timing parameters associated with a User Equipment ("UE") connected to a radio access network ("RAN") of a wireless network, wherein the first set of timing parameters indicate time intervals at which traffic is able to be wirelessly communicated between the UE and the RAN, and
   determine a quantity of instances that traffic was communicated between the UE and the RAN at a beginning of one or more time intervals, indicated by the first set of timing parameters; and
   generate a second set of timing parameters based on the quantity of instances that traffic was communicated between the UE and the RAN at the beginning of the one or more time intervals,
      wherein the UE and the RAN communicate using the second set of timing parameters in lieu of the first set of timing parameters.

9. The non-transitory computer-readable medium of claim 8, wherein the plurality of processor-executable instructions further include processor-executable instructions to:
   generate one or more scores based on:
      the determined quantity of instances that traffic was communicated between the UE and the RAN at the beginning of the one or more time intervals, and
      one or more additional factors,
      wherein generating the second set of timing parameters is further based on the generated one or more scores.

10. The non-transitory computer-readable medium of claim 8, wherein the UE is a first UE, wherein the plurality of processor-executable instructions further include processor-executable instructions to:
   determine that the first UE and a second UE are associated with a same category; and
   associate the second UE with the second set of timing parameters based on determining that the first UE and the second UE are associated with the same category.

11. The non-transitory computer-readable medium of claim 8, wherein the UE determines the quantity of instances that traffic was communicated between the UE and the RAN at the beginning of the one or more time intervals.

12. The non-transitory computer-readable medium of claim 8, wherein the quantity of instances that traffic was communicated at the beginning of the one or more time intervals includes:
   a quantity of instances that traffic was communicated within a threshold period of time after the beginning of the one or more time intervals.

13. The non-transitory computer-readable medium of claim 8, wherein the first set of timing parameters specify:
   an ON duration during which traffic is able to be wirelessly communicated between the UE and the RAN, and
   an OFF duration during which traffic is not able to be wirelessly communicated between the UE and the RAN,
   wherein the quantity of instances that traffic was communicated at the beginning of the one or more time intervals includes a quantity of instances that traffic was communicated within a threshold period of time after the beginning of one or more ON durations.

14. The non-transitory computer-readable medium of claim 13, wherein the plurality of processor-executable instructions further include processor-executable instructions to:
   determine a measure of delay for each instance of traffic that was communicated between the UE and the RAN at the beginning of the one or more ON durations,
   wherein generating the second set of timing parameters is further based on the determined measure of delay for each instance of traffic that was communicated between the UE and the RAN at the beginning of the one or more ON durations.

15. A method, comprising:
   identifying a first set of timing parameters associated with a User Equipment ("UE") connected to a radio access network ("RAN") of a wireless network, wherein the first set of timing parameters indicate time intervals at which traffic is able to be wirelessly communicated between the UE and the RAN, and
   determining a quantity of instances that traffic was communicated between the UE and the RAN at a beginning of one or more time intervals, indicated by the first set of timing parameters; and
   generating a second set of timing parameters based on the quantity of instances that traffic was communicated between the UE and the RAN at the beginning of the one or more time intervals,
      wherein the UE and the RAN communicate using the second set of timing parameters in lieu of the first set of timing parameters.

16. The method of claim 15, further comprising:
   generating one or more scores based on:
      the determined quantity of instances that traffic was communicated between the UE and the RAN at the beginning of the one or more time intervals, and
      one or more additional factors,
      wherein generating the second set of timing parameters is further based on the generated one or more scores.

17. The method of claim 15, wherein the UE is a first UE, the method further comprising:
   determining that the first UE and a second UE are associated with a same category; and associating the second UE with the second set of timing parameters based on determining that the first UE and the second UE are associated with the same category.

18. The method of claim 15, wherein the UE determines the quantity of instances that traffic was communicated between the UE and the RAN at the beginning of the one or more time intervals.

19. The method of claim 15, wherein the quantity of instances that traffic was communicated at the beginning of the one or more time intervals includes:
   a quantity of instances that traffic was communicated within a threshold period of time after the beginning of the one or more time intervals.

20. The method of claim 15, wherein the first set of timing parameters specify:
   an ON duration during which traffic is able to be wirelessly communicated between the UE and the RAN, and
   an OFF duration during which traffic is not able to be wirelessly communicated between the UE and the RAN,
   wherein the quantity of instances that traffic was communicated at the beginning of the one or more time intervals includes a quantity of instances that traffic was communicated within a threshold period of time after the beginning of one or more ON durations,
   wherein the method further comprises determining a measure of delay for each instance of traffic that was communicated between the UE and the RAN at the beginning of the one or more ON durations,
      wherein generating the second set of timing parameters is further based on the determined measure of delay for each instance of traffic that was communicated between the UE and the RAN at the beginning of the one or more ON durations.

* * * * *